Oct. 30, 1951     O. G. ROMIG     2,573,221
COMPRESSION LINK FOR TRACTOR HITCHES
Filed Dec. 15, 1947     2 SHEETS—SHEET 1

INVENTOR,
Oscar G. Romig.
BY Roy E. Hamilton
Attorney

Oct. 30, 1951          O. G. ROMIG          2,573,221
COMPRESSION LINK FOR TRACTOR HITCHES
Filed Dec. 15, 1947          2 SHEETS—SHEET 2
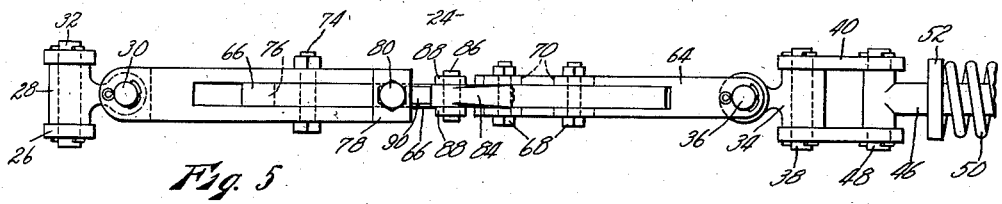
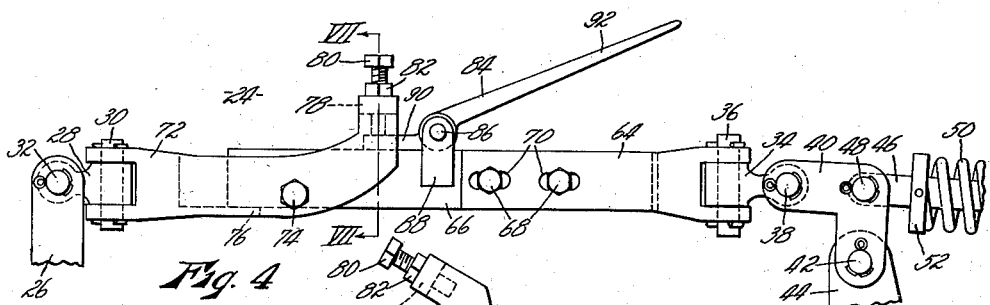
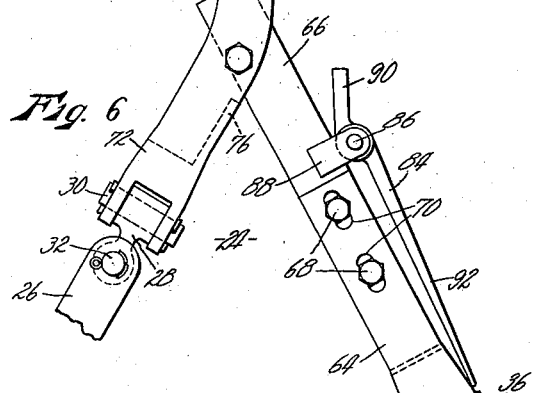
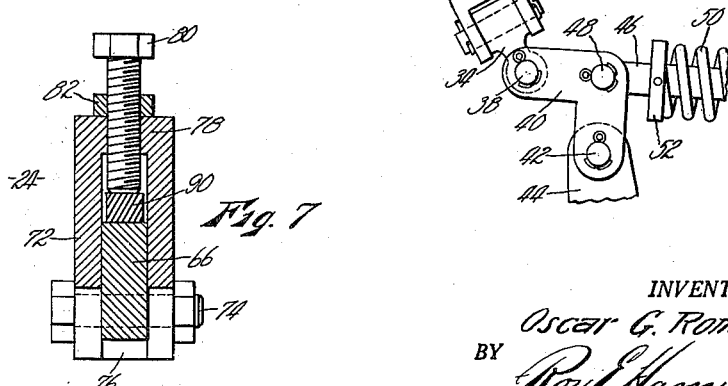
INVENTOR,
Oscar G. Romig,
BY Roy E. Hamilton,
Attorney.

Patented Oct. 30, 1951

2,573,221

UNITED STATES PATENT OFFICE 2,573,221

COMPRESSION LINK FOR TRACTOR HITCHES

Oscar G. Romig, St. Joseph, Mo.

Application December 15, 1947, Serial No. 791,688

3 Claims. (Cl. 97—47)

This invention relates to new and useful improvements in compression link for a tractor hitch, and has particular reference to a compression link having a toggle joint therein which may be taken when desired to render said link inoperative.

Farming implements and other earth working implements are often drawn behind a tractor by means of a hitch having a compression link loaded by the upward force of the earth on said implement. When the tractor crosses a gulley or starts up a sharply inclined hill, the rear traction wheels of the tractor may be supported above the ground by said compression link. The tractor then can not move, since it has no traction and it requires heavy work to free it. The principal object of this invention is, therefore, the provision, in a tractor hitch of the class described, of a compression link having a toggle joint therein, and means for breaking said joint while said link is under a heavy compressional load.

Another object is the provision, in a tractor hitch of the class described, of a compression link supported pivotally at each end and being jointed pivotally at an intermediate point, said joint being normally disposed beneath a centerline connecting said end pivots, an adjustable stop limiting the downward pivoting of said pivot, and lever means for moving said joint across said centerline, whereby said link will be buckled by the compressional load therein.

Other objects are simplicity and economy of construction and ease and efficiency of operation.

With these objects in view, as well as other objects which will appear in the course of the specification, reference will be had to the drawing, wherein:

Fig. 4 is an enlarged fragmentary section taken on line IV—IV of Fig. 3, showing a side elevation of the compression link.

Fig. 5 is a plan view of the parts shown in Fig. 4, partially broken away.

Fig. 6 is a view of the parts shown in Fig. 4, showing the compression link in its buckled position.

Fig. 7 is an enlarged vertical section taken on line VII—VII of Fig. 4.

Figure 1:
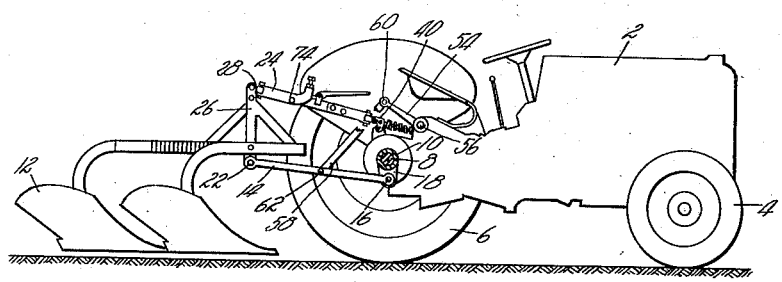
Figure 1 is a side elevation of a tractor with parts broken away, showing a plow attached thereto by means of a hitch including a compression link embodying the present invention.

Like reference numerals apply to similar parts throughout the several views, and the numeral 2 applies to a tractor supported by front wheels 4 and rear traction wheels 6, said rear wheels being carried on an axle 8 rotatably carried in housing 10. A ground working implement such as plow 12 may be drawn behind said tractor by means of a linkage comprising a pair of drawbars 14 pivotally connected at their forward ends at 16 to brackets 18 integral with axle housing 10 and pivotally connected at their rearward ends to a tranverse bar 22 carried rigidly by the frame of plow 12 and a compression link 24. Said compression link best shown in Figs. 4–7, is universally pivoted at its rearward end to an upwardly extending standard 26 rigidly fixed to the frame of plow 12, by means of a block 28 pivotally secured to link 24 by pin 30 and to standard 26 by pin 32, pin 32 being disposed at right angles to pin 30. At its forward end link 24 is pivotally connected to a block 34 by pin 36, and said block being pivotally connected by pin 38 to the rearwardly extending arm of a bell crank 40 the opposite arm of said crank being pivotally connected by pin 42 to a lug 44 fixed rigidly to the tractor housing.

A forwardly extending rod 46 is pivotally connected on a transverse axis at 48 to crank 40 at the angle thereof. Said rod extends forwardly into the tractor housing and is there adapted to control automatically powered means for operating the hereinafter described lift mechanism for regulating the depth of the plow.

A spring 50 encircling rod 46 is compressed between the tractor housing and a collar 52 carried rigidly on said rod. The lift mechanism comprises a pair of cranks 54 carried for oscillation by the tractor housing on transverse axle 56 and operable by powered means not shown, and a pair of lift bars 58, each of said lift bars being pivotally connected at its upper end to one of cranks 54 at 60, and pivotally connected at its lower end at 62 to the adjacent draw bar 14 intermediate the ends thereof.

Figure 2:
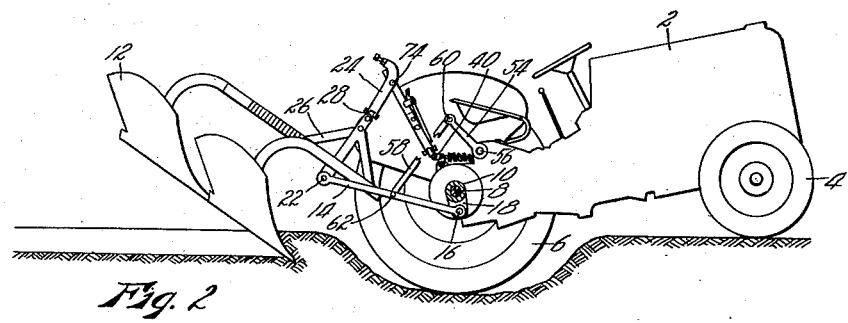
Fig. 2 is a view of the parts shown in Fig. 1, showing the relative position assumed by the parts when the rear wheels of the tractor pass over a gulley and the compression link is buckled.
Figure 3:
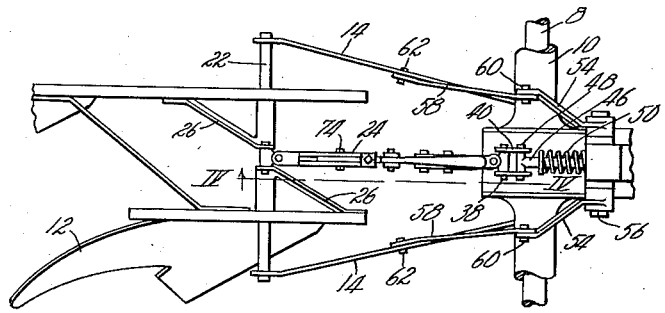
Fig. 3 is an enlarged fragmentary plan view of the parts shown in Fig. 1.

Thus it will be seen that plow 12 is carried on a substantial parallelogram of links, the links comprising drawbars 14, compression link 24, standard 26, and the tractor frame. The motion of crank 40 is so slight that for most purposes link 24 may be considered as pivotally connected directly to the tractor frame. Thus the plow must move substantially vertically as it is raised and lowered by cranks 54. When the tractor is pulled through the ground, drawbars 14 are in tension and link 24 is under compression. It will be seen that when the rear wheels of the tractor pass over a gulley as shown in Fig. 2, with the plow and front wheels 4 still supported on the general ground level, the weight of the tractor will be supported by an additional compressional load in link 24 and tensional loads in drawbars 14, and wheels 6 will be supported thereby above the ground. The plow may not be elevated in the usual manner to lower wheels 10 6 since this would necessitate the rearward tilting of the parallelogram link formed by standard 26, and this can not be done because the plow, which is rigidly connected with standard 26, is firmly pressed in the ground. Furthermore, the gulley may be so deep that the amount of lift available by cranks 54 is not sufficient to allow wheels 6 to contact the ground at the bottom of the gulley.

Hence, in the usual linkage in which link 24 is a rigid, one-piece member, the tractor will be stalled since wheels 6 have no traction to pull it forwardly, and it is a task of considerable magnitude to free the tractor. This invention contemplates the use of a compression link 24 as shown in Figs. 4–7, including a forward member 64 universally pivoted at its forward end to bell crank 40 as previously described and bifurcated at its rearward end to receive therein a rearwardly extending bar 66. Said bar is fixed to bifurcated member 64 by bolts 68, said bolts extending through longitudinally elongated slots 70 in member 64 to permit adjustment of the length of link 24. A rear member 72 is universally pivoted to standard 26 as previously described and is bifurcated at its forward end to receive therein the rearwardly extended end of bar 66. Bar 66 is pivotally connected to member 72 on a transverse axis formed by bolt 74, said bolt being disposed, when the link is in its extended position, below a centerline connecting pivot pins 32 and 38, as shown in Fig. 4. Thus any compressive load in the link tends to pivot member 72 and bar 66 downwardly, and this downward pivoting is limited by a floor member 76 extending between the sides of bifurcated member 72 and adapted to arrest the downward movement of the rearward end of bar 66. It will be noted that the weight of the link parts will normally urge said link toward its extended or rigid position.

The sides of bifurcated member 72 extend forwardly and upwardly from bolt 74, and are connected at their ends by a connecting portion 78 extending above the upper edge of bar 66, and an adjusting screw 80 is threadably engaged in said connecting portion. The position of said screw may be fixed by means of locknut 82. An operating lever 84 is carried for oscillation on a pivot pin 86 transverse to the longitudinal axis of the link and carried in brackets 88 rigidly fixed to bar 66 forward of screw 80. Said operating lever is provided with a rearwardly extending finger 90 normally disposed between the upper edge of bar 66 and the lower end of screw 80, as best shown in Fig. 4, and a forwardly extending handle portion 92. When screw 80 is advanced downwardly, it is apparent that member 72 and bar 66 will be pivoted upwardly. In this manner the disposition of bolt 74 relative to the longitudinal centerline of the link, and hence the force required to buckle the link, may be adjusted.

When the tractor wheels 6 become suspended over a gulley or ditch as previously described, the operator has only to press downwardly on handle 92 of lever 84. Finger 90 of said lever, acting on screw 80, will then pivot member 72 upwardly. When pivot 74 has been elevated slightly above the longitudinal centerline of the link, the compressional load in the link will cause said pivot to buckle upwardly as shown in Figs. 2 and 6. Plow 12 is then free to be pivoted upwardly freely as shown, thus allowing wheels 6 to fall to the ground. The tractor, since its traction wheels then engage the ground, may pull out of the gulley under its own power. When the tractor again reaches level ground, link 24 will be returned to its extended rigid position by gravity.

Thus it is apparent that the tractor may safely cross gulleys of a greater depth than the lift afforded by cranks 54. It should be noted that the showing in Fig. 2 does not represent the maximum depth of gulley which may be traversed. Should the gulley be deeper still, universal joint 28 at the rearward end of compression link 24 will buckle forwardly, and plow 12 will be further elevated by rotation about pivot 22.

It is apparent that many variations of construction and operation could be made within the scope of the appended claims, without departing from the spirit of the invention.

What I claim is:

1. In a tractor hitch of the class described for pulling earth working implements behind a tractor and having a component link placed under a compressive stress when the rear wheels of said tractor pass over a depression in the ground, a compression link pivotally supported at both ends and comprising two elongated members pivotally joined on a transverse pivot pin normally displaced in one direction from the longitudinal centerline of the link, an adjustable stop limiting the movement of said pivot pin in said named direction whereby the amount of said displacement may be adjusted, and means carried by said link for moving said pivot pin across said centerline to allow said link to buckle.

2. In a tractor hitch of the class described for pulling earth working implements behind a tractor and having a component link placed under a compressive stress when the rear wheels of said tractor pass over a depression in the ground, a compression link pivotally supported at both ends and comprising two elongated members pivotally joined on a transverse pivot pin normally displaced in one direction from the longitudinal centerline of the link, one of said elongated members being extended past said pivot pin, an adjustable stop carried on said extended portion and adapted to abut against an operating member carried by the other of said elongated members, thereby adjustably limiting the displacement of said pivot and a manually operable member carried by said second named elongated member for moving said stop to move said pivot pin to cross said centerline, thereby allowing said link to buckle.

3. In a tractor hitch of the class described for pulling earth working implements behind a tractor and having a component link placed under a compressive stress when the rear wheels of said tractor pass over a depression in the ground, an approximately horizontal compression link supported at each end by a universal connection and comprising two elongated members joined intermediate the ends of the link by a pivot pin normally disposed beneath the longitudinal centerline of the link, the first of said link members extending past said pivot pin, an adjustable screw carried at the extended end of said link member, and a lever carried pivotally by the second of said link members and against which said screw abuts to limit the downward movement of said pivot pin, said lever being manually operable to pivot said first named link member upwardly to move said pivot pin above the centerline of the link, thereby permitting said link to buckle upwardly.

OSCAR G. ROMIG.

REFERENCES CITED

The following references are of record in the file of this patent:

UNITED STATES PATENTS

| Number | Name | Date |
| --- | --- | --- |
| 1,556,508 | Hentzell et al. | Oct. 6, 1925 |
| 2,223,002 | Ferguson | Nov. 26, 1940 |
| 2,375,025 | Mott | May 1, 1945 |
| 2,381,588 | Hall | Aug. 7, 1945 |
| 2,405,980 | Sands et al. | Aug. 20, 1946 |
| 2,415,968 | Price | Feb. 18, 1947 |
| 2,433,019 | Arps | Dec. 23, 1947 |